(12) United States Patent
Bucher

(10) Patent No.: US 7,800,483 B2
(45) Date of Patent: Sep. 21, 2010

(54) TRANSITIONAL LIGHTING SYSTEM FOR VEHICLE INTERIOR

(75) Inventor: Lloyd K. Bucher, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 350 days.

(21) Appl. No.: 11/936,995

(22) Filed: Nov. 8, 2007

(65) Prior Publication Data

US 2008/0112175 A1 May 15, 2008

Related U.S. Application Data

(60) Provisional application No. 60/865,175, filed on Nov. 10, 2006.

(51) Int. Cl.
*B60Q 1/00* (2006.01)
*B60Q 1/26* (2006.01)

(52) U.S. Cl. .................................... 340/425.5; 362/490

(58) Field of Classification Search .............. 340/425.5; 362/490
See application file for complete search history.

(56) References Cited

U.S. PATENT DOCUMENTS

| | | | |
|---|---|---|---|
| 4,686,609 A | | 8/1987 | Dykstra et al. |
| 5,070,434 A | * | 12/1991 | Suman et al. ................ 362/490 |
| 5,508,897 A | * | 4/1996 | Van Order ................... 362/490 |
| 5,582,474 A | | 12/1996 | VanOrder et al. |
| 5,803,579 A | | 9/1998 | Turnbull et al. |
| 5,831,389 A | | 11/1998 | Kawashima et al. |
| 6,132,072 A | | 10/2000 | Turnbull et al. |
| 6,158,882 A | | 12/2000 | Bischoff, Jr. |
| 6,351,072 B1 | * | 2/2002 | Mutoh et al. ................. 315/77 |
| 6,464,381 B2 | | 10/2002 | Anderson, Jr. et al. |
| 6,502,969 B2 | | 1/2003 | Logel et al. |
| 6,536,928 B1 | | 3/2003 | Hein et al. |
| 6,641,294 B2 | | 11/2003 | Lefebvre |

(Continued)

FOREIGN PATENT DOCUMENTS

| | | |
|---|---|---|
| FR | 2620396 A1 | 3/1989 |
| FR | 2880313 A1 | 7/2006 |

*Primary Examiner*—Daniel Wu
*Assistant Examiner*—John F Mortell
(74) *Attorney, Agent, or Firm*—Dickinson Wright PLLC

(57) ABSTRACT

A method for controlling the intensity of light within an interior passenger compartment in a motor vehicle to create perceived sensations of safety, comfort and personal accommodation in conjunction with specified, night time, driving-related occurrences. The natural human desire for safety is satisfied as a driver approaches a parked motor vehicle by illuminating the interior passenger compartment with a plurality of light sources (18, 20, 22) in response to having produced a safety approach signal. The natural human desire to be comfortable within a confined space is satisfied by the act of opening the door (28), whereupon the interior illumination intensity is automatically lowered to a second intensity level. Once the transmission shift selector is moved out of its Park condition, the interior light intensity is automatically decreased to a third intensity level to provide the sensation of stress reduction and thus satisfy the natural human desire to be at peace. Intermittently during the third intensity level mode, the driver or other occupants may have a task driven desire to illuminate a localized region of the passenger compartment, which is accommodated by a spot light sub-assembly (22) creating a directional beam of light within the passenger compartment.

4 Claims, 10 Drawing Sheets

U.S. PATENT DOCUMENTS

| | | |
|---|---|---|
| 6,773,129 B2 | 8/2004 | Anderson, Jr. et al. |
| 6,796,690 B2 | 9/2004 | Bohlander |
| 6,871,981 B2 | 3/2005 | Alexanderson et al. |
| 6,935,763 B2 | 8/2005 | Mueller et al. |
| 6,949,882 B2 * | 9/2005 | Suyama et al. ................ 315/77 |
| 2003/0142504 A1 | 7/2003 | Mueller |
| 2005/0111231 A1 | 5/2005 | Crodian et al. |
| 2005/0174791 A1 | 8/2005 | Bynum |
| 2005/0237754 A1 | 10/2005 | Klettke |
| 2005/0237766 A1 | 10/2005 | Klettke |
| 2005/0248283 A1 | 11/2005 | Oyaski |
| 2006/0113810 A1 | 6/2006 | Kuhl et al. |

* cited by examiner

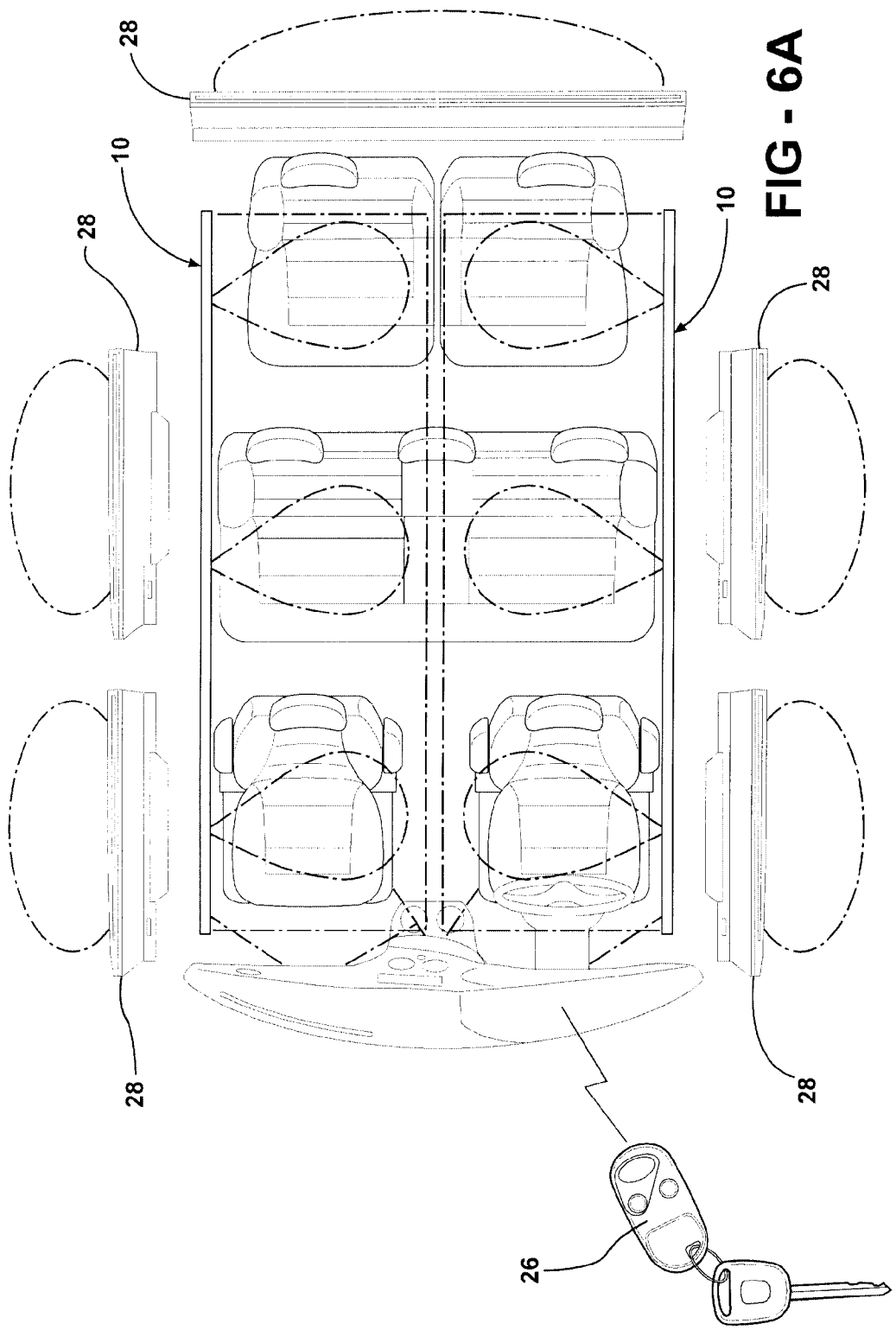

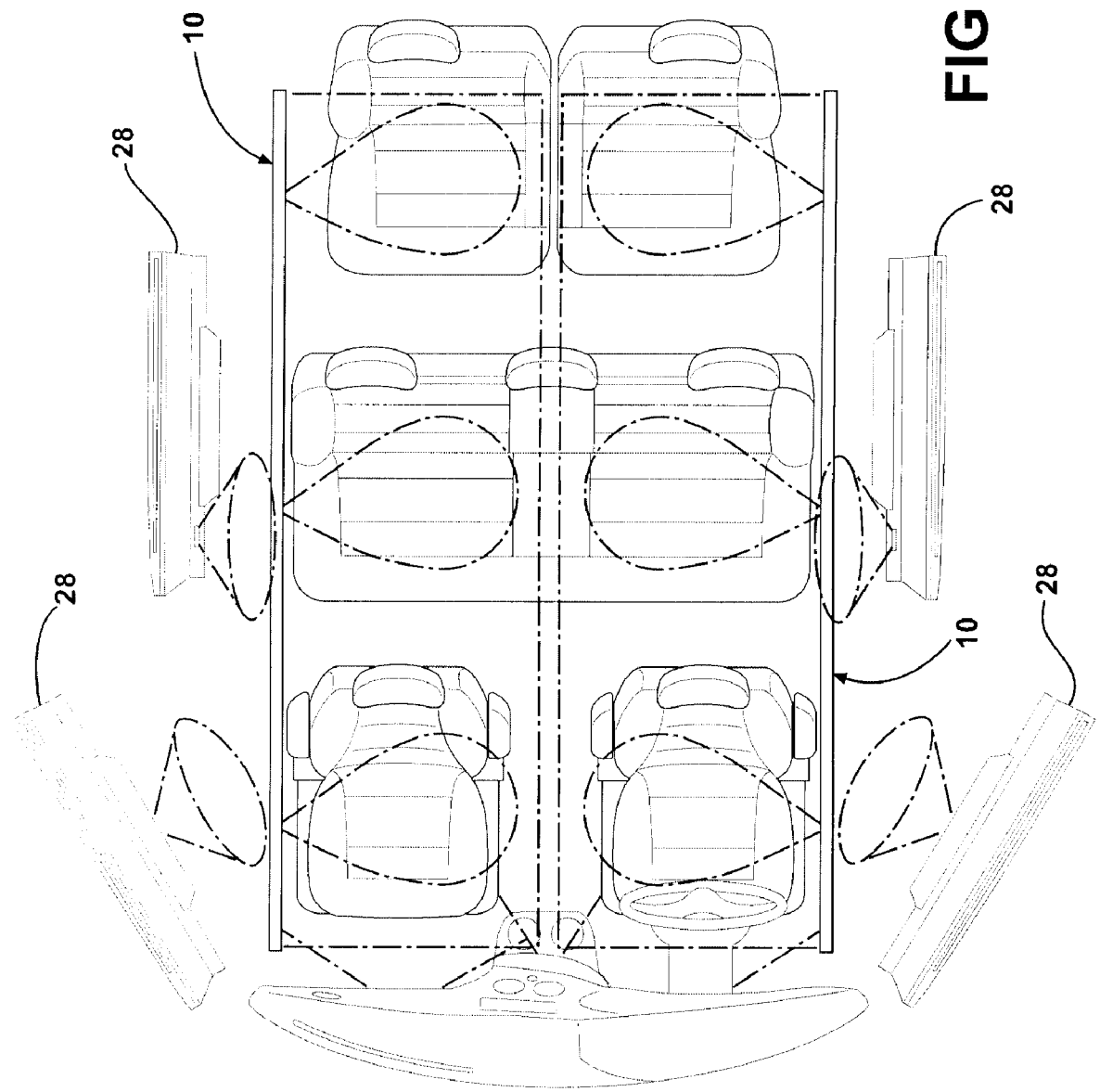

TRANSITIONAL LIGHTING SYSTEM FOR VEHICLE INTERIOR

CROSS REFERENCE TO RELATED APPLICATIONS

This application claims the benefit of priority to U.S. Provisional Patent Application No. 60/865,175 filed Nov. 10, 2006.

BACKGROUND OF THE INVENTION

1. Field of the Invention

This invention relates generally to methods for illuminating the interior passenger compartment of a motor vehicle, and more specifically toward an attractive linear array of lighting assemblies which can be sequentially activated through phases of high intensity general illumination, low intensity general illumination in multiple colors, and high intensity spot illumination.

2. Related Art

Lighting assemblies are well known for use in motor vehicle interior cabins. Such lighting assemblies provide direct lighting, indirect lighting and back lighting, among other applications, and have become smaller, more efficient, more durable and longer lasting. Typically, indirect, or general illumination lighting is accomplished by dome lamp assemblies or other light devices which attempt to disperse light over a large area, but never fully achieve this goal. This is in contrast to direct or task lighting applications, such as map or reading lights, where light from the light source is focused onto a relatively narrow area.

Typically, the flood and spot lighting features are accomplished by separate lighting assemblies dedicated to each function. As an alternative, variable focus lighting assemblies have been proposed with limited functionality. Usually, these devices employ some technique of adjusting the beam pattern between dispersed and concentrated conditions. Applicant's U.S. Pat. No. 7,022,029 granted May 22, 2007, is an example of such an assembly, the entire disclosure of which is hereby incorporated by reference. Another example of an interior lighting assembly that provides both flood and task lighting may be had by reference to U.S. Pat. No. 5,582,474. US Publication Number 2005/0111231 discloses a lighting control system used to selectively turn on and off LED lights and/or alter the color of light output.

Notwithstanding these prior art constructions, there exists a need in this field for an improved lighting assembly which can transition between multiple phases or stages, wherein each stage solves a common issue experienced by people subjected to nighttime, driving-related stresses that include whether the interior space is safe, whether the interior space is comfortable, whether the interior space is peaceful, and whether the interior space meets specific, task-oriented personal needs.

SUMMARY OF THE INVENTION

The subject invention overcomes the disadvantages and shortcomings of the prior art by providing, in a preferred embodiment, method for deliberately controlling the intensity of light within an interior passenger compartment in a motor vehicle to create perceived sensations of safety, comfort and personal accommodation in conjunction with specified night time, driving-related occurrences. The method comprises the steps of approaching a parked motor vehicle of the type having an interior passenger compartment, at least one door for accessing the passenger compartment, and a transmission shift selector disposed within the passenger compartment; producing a safety approach signal; illuminating the interior passenger compartment with a plurality of light sources inside the passenger compartment to achieve a maximum first intensity level of light in response to producing the safety approach signal; opening the door following the step of illuminating the interior passenger compartment; automatically decreasing the interior illumination intensity to a lower second intensity level in response to opening the door; and automatically decreasing the interior light intensity to a third intensity level, lower than the second intensity level, in response to moving the transmission shift selector away from a Park condition.

One or more lighting assemblies configured to carry out the novel method may be mounted to a headliner within the passenger compartment and extend the full length of the vehicle interior. Preferably, two such lamp assemblies are mounted parallel along opposite sides of the headliner. The lamp assemblies will provide a smooth, uniform light projected downwardly into the passenger compartment space. Incandescent, LED or fluorescent light sources, together with appropriate optics, may be used to provide smooth lighting and transitional functionality so as to create the perceived sensations of safety, comfort and personal accommodation.

Light emitted from the light assembly can be white to help fully illuminate the vehicle interior and/or change to a blue or other colored light so as to provide a mood-type setting or a color scheme specified by the individual so as to provide brand identification. Separate light sources may be employed to provide the different color effects. A swiveling, movable spot lamp, i.e., a reading lamp or map lamp, is designed into the light assembly to provide targeted lighting for reading or viewing an object. Light could be white or colored to enhance reading or observing an object. A switch, either integral with the spot lamp or mounted to the side of the spot lamp, would activate its light source.

The subject light assembly enables the output of smooth lighting for flooding the vehicle interior passenger compartment with light when entering or exiting the vehicle. This provides a degree of safety for those entering or exiting the vehicle. White or colored mood lighting can be provided in a second, low-intensity mode of operation for a subdued level of light. A swiveling, movable spot lamp is incorporated into the subject light assembly for reading or observing an object.

BRIEF DESCRIPTION OF THE DRAWINGS

These and other features and advantages of the present invention will become more readily appreciated when considered in connection with the following detailed description and appended drawings, wherein:

FIGS. 6A-6D graphically depict the various transitional stages of the subject method;

DETAILED DESCRIPTION OF THE PREFERRED EMBODIMENT

Figure 1:
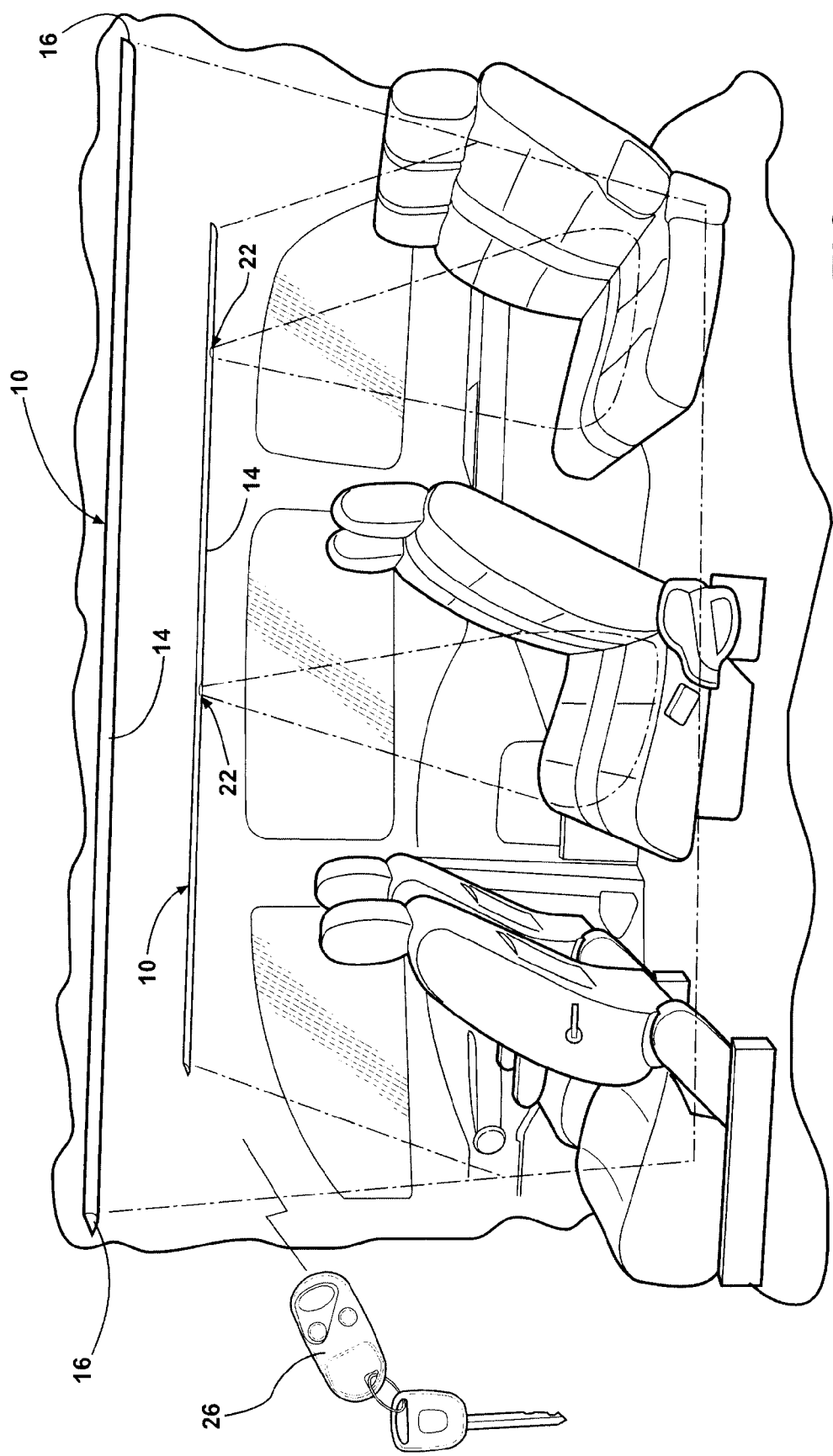
FIG. 1 is a fragmentary, cut away view of a vehicle interior passenger compartment including a pair of light assemblies according to the subject invention affixed below the headliner and illuminating the interior passenger compartment with a subdued lighting effect while a pair of energized spot lamps provide targeted lighting.

Referring to the Figures, wherein like numerals indicate like or corresponding parts throughout the several view, a lighting assembly according to the subject invention is generally shown at 10 affixed below a headliner, which in turn covers the underside of a roof of a motor vehicle. The lighting assembly 10 is an elongated device having a base 12 which is affixed directly to the headliner or underside of the vehicular roof. A trough-like outer diffuser lens 14 covers the base 12 and is translucent so as to smoothly and evenly disperse light emitted from the lighting assembly 10. A light pipe or other inner lens may also diffuse the light with or without the outer diffuser lens 14. The lighting assembly 10 may also include end caps 16 or other features to provide an aesthetically appealing termination of the base 12 and diffuser lens 14.

A plurality of light sources 18 are affixed to the base 12 substantially along the length thereof. As perhaps best shown in FIGS. 3-5, the light sources 18 may comprise LED devices very closely arrayed. Some of the light sources may be colored 20 or otherwise possess different lighting characteristics than the normal array of light sources 18. In an alternative embodiment not illustrated but fully contemplated by the inventor, the multiple light sources 18 could be replaced by a single light source combined with one or more wave guide devices for piping the emitted light along the length of the assembly 10 and evenly distributing white and/or colored light.

Figure 2:
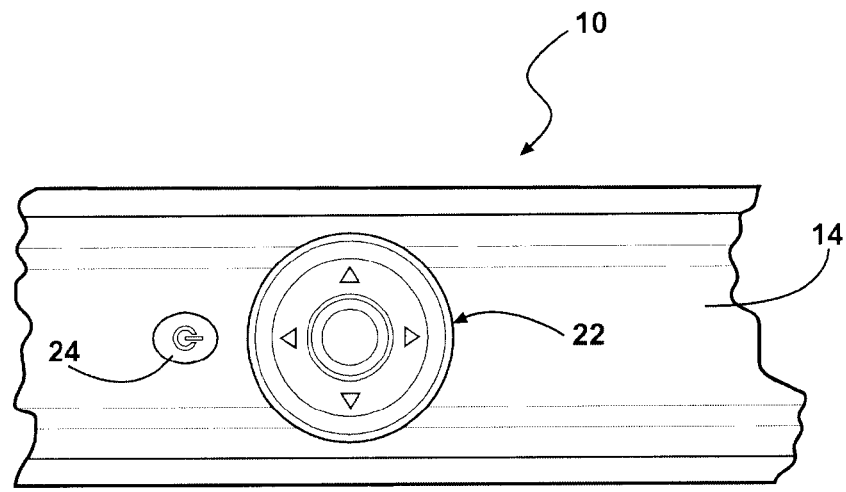
FIG. 2 is a fragmentary top view of the subject lighting assembly showing a diffuser lens together with a spot light and its associated power switch.

The lighting assembly 10 further includes a spot-light sub-assembly, generally indicated at 22 in FIGS. 2-5. The spot light sub-assembly 22 is preferably a swiveling, movable spot lamp of the reading lamp or map lamp type. The spot light 22 is integrated into the diffuser lens 14 so as to be exposed for ready use and manipulation. Light emitted from the spot light sub-assembly 22 may be either white or colored to enhance reading or observing an object. As shown in FIG. 2, the spot light sub-assembly 22 may include a switch 24 to activate the spot light 22. Alternatively, the switch 24 may be integrated into the light optics for the spot light sub-assembly 22 much in the same manner as shown and described in the U.S. Pat. No. 7,022,029 granted May 22, 2007, assigned to the Assignee of the subject invention and hereby incorporated in its entirety by reference and relied upon.

Figure 4:
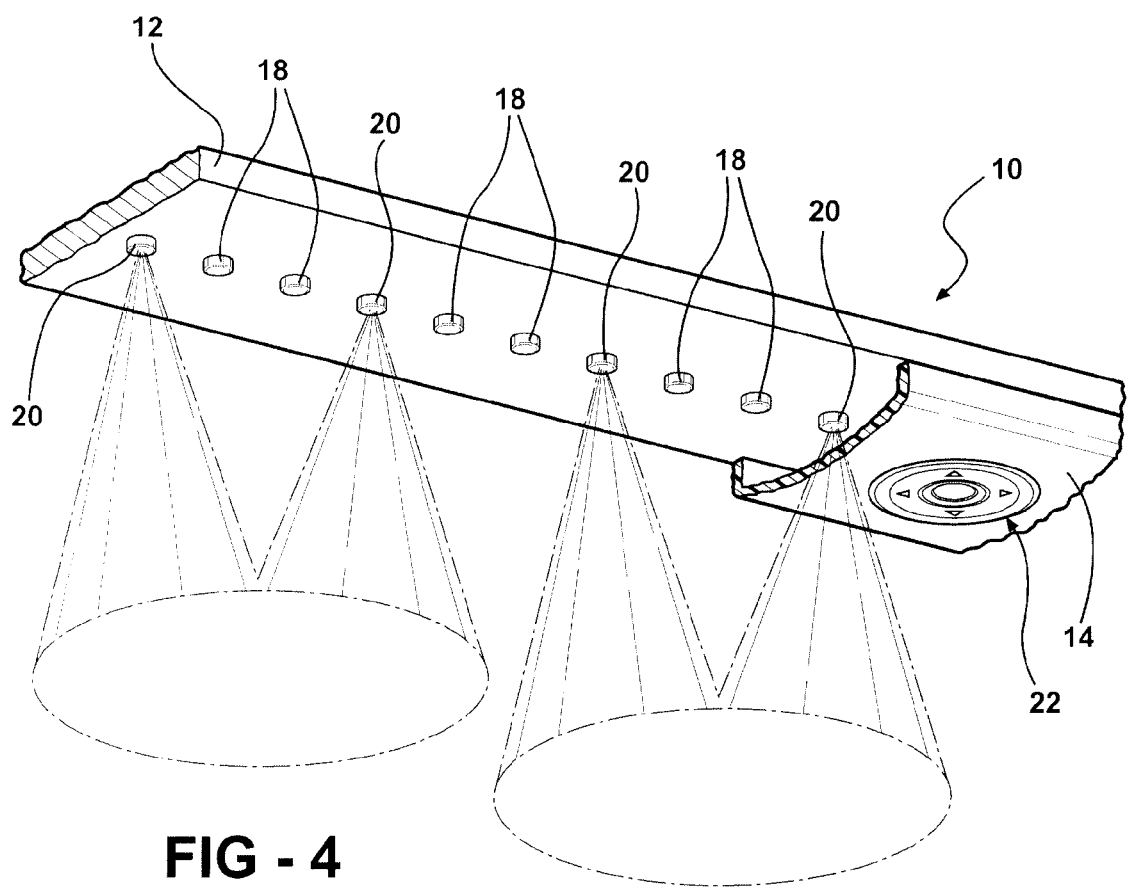
FIG. 4 is a view as in FIG. 3 but showing a select minority of light sources energized to create a low-intensity general illumination within the vehicle passenger compartment.
Figure 5:
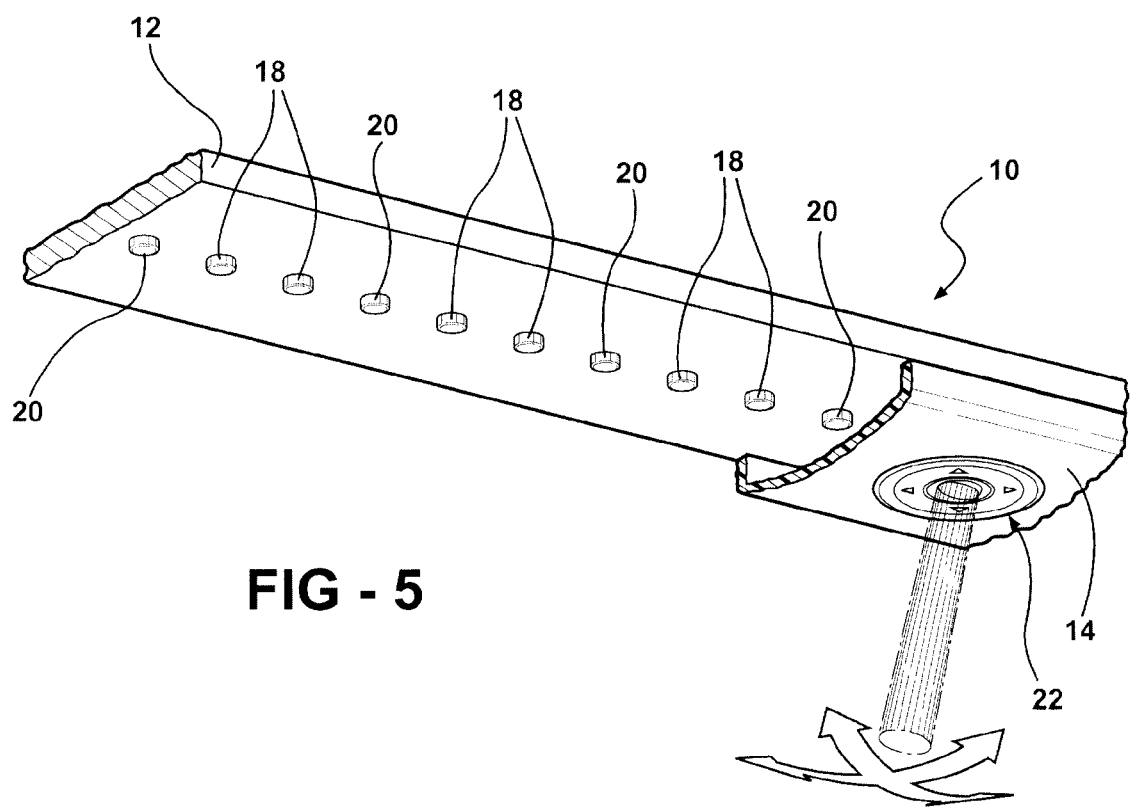
FIG. 5 is a view as in FIG. 3 but depicting only the spot lamp energized to provide a high-intensity spot beam which can be movably directed as indicated by directional arrows.
Figure 6:
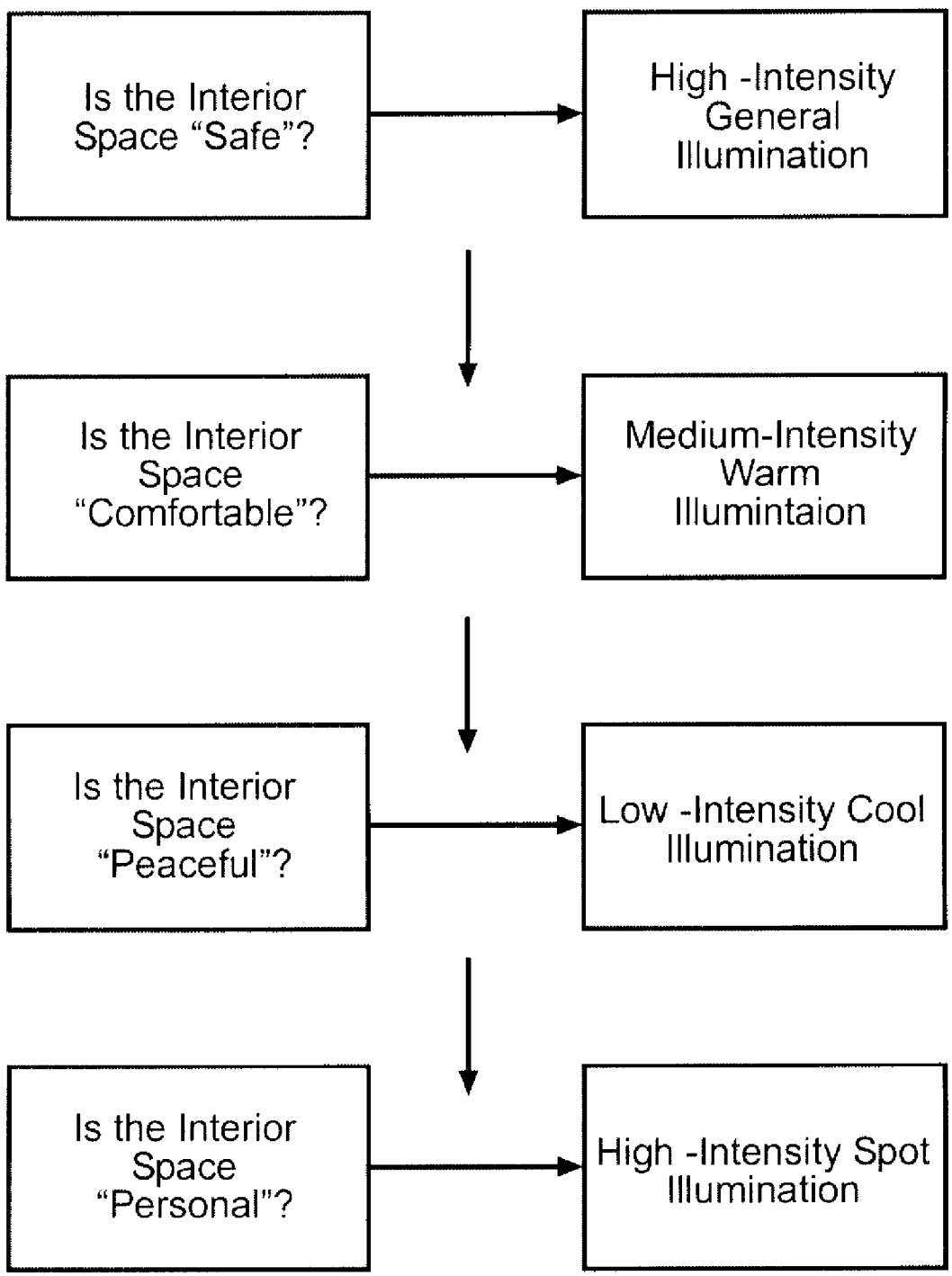
FIG. 6 is a simplified flowchart describing the transitional stages through which the subject lighting assembly can be manipulated to create the perceived sensations of safety, comfort and personal accommodation.

Turning now to FIG. 6, together with reference to FIGS. 3-5 and 6A-6D, the subject transitional lighting system is described in a context of practical human situations that frequently give rise to concern during night time and other low-visibility conditions. Solutions for these various concerns are provided by the subject invention by creating perceived sensations of safety, comfort and personal accommodation in conjunction with specified, predictable driving-related occurrences during the night. These human situations are often times manifested as subliminal questions asked to one's self. For example, when approaching the vehicle at night in a dark or poorly lit area, the average person will wonder whether the interior space of the vehicle is safe. If the interior space in a vehicle is dark or poorly illuminated, there is a normal fear that someone or something unsafe may be hiding inside the passenger compartment. The subject lighting assembly 10 addresses this concern by fostering the sensation of safety brightly illuminating the vehicle interior space. Thus, as a driver approaches their vehicle at night, the driver can depress an appropriate button on a key fob 26 or lift the handle of their door latch and thereby energize the subject lighting assembly 10 to flood the interior spaces with high-intensity light. The driver is then reassured by the bright, white light that there is not a prowler hiding in or around their vehicle.

Figure 3:
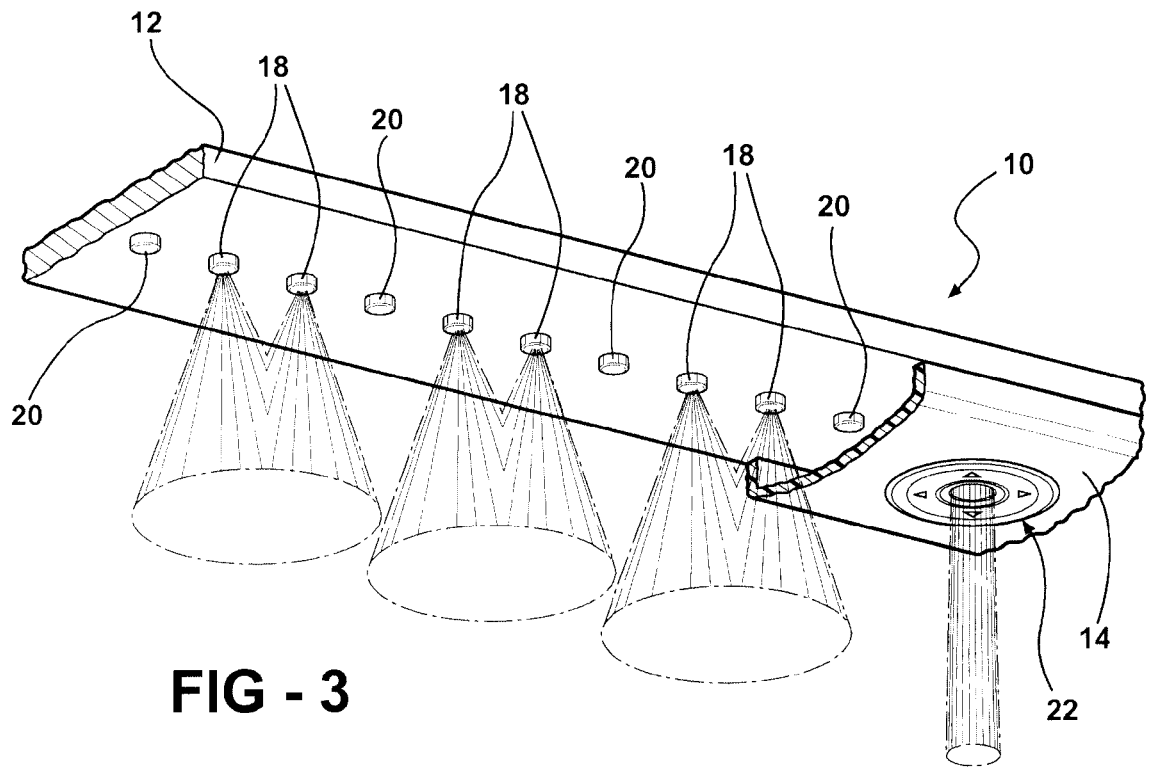
FIG. 3 is a fragmentary perspective view of the subject lighting assembly wherein the diffuser lens is partially broken away to reveal an array of light sources energized so as to provide a high-intensity general illumination within the vehicle passenger compartment.
Figure 7:
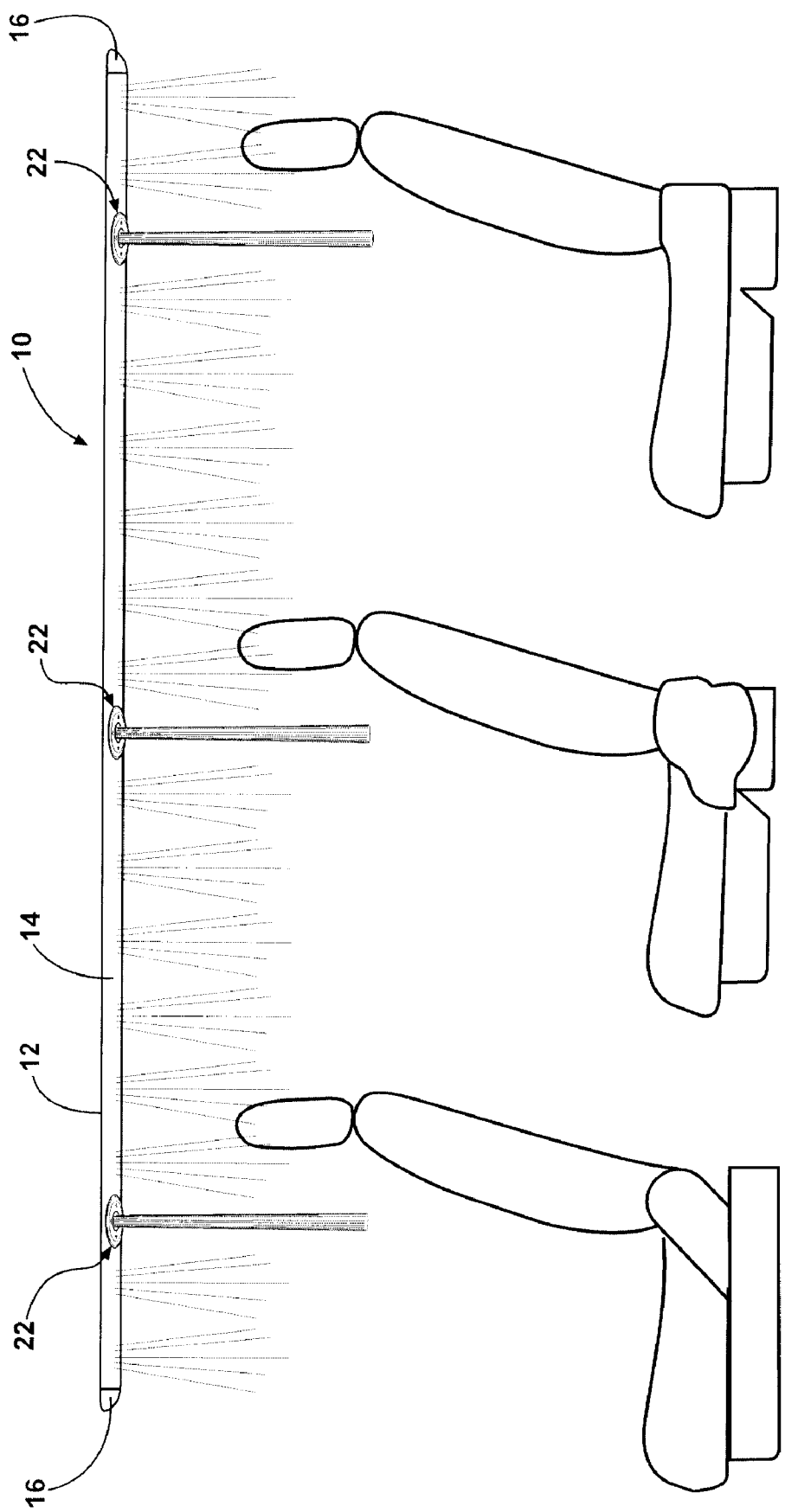
FIG. 7 is a schematic view of a vehicle interior passenger compartment as represented by three vehicle seats and an overhead lighting assembly according to the subject invention in first intensity level, general illumination mode.
Figure 8:
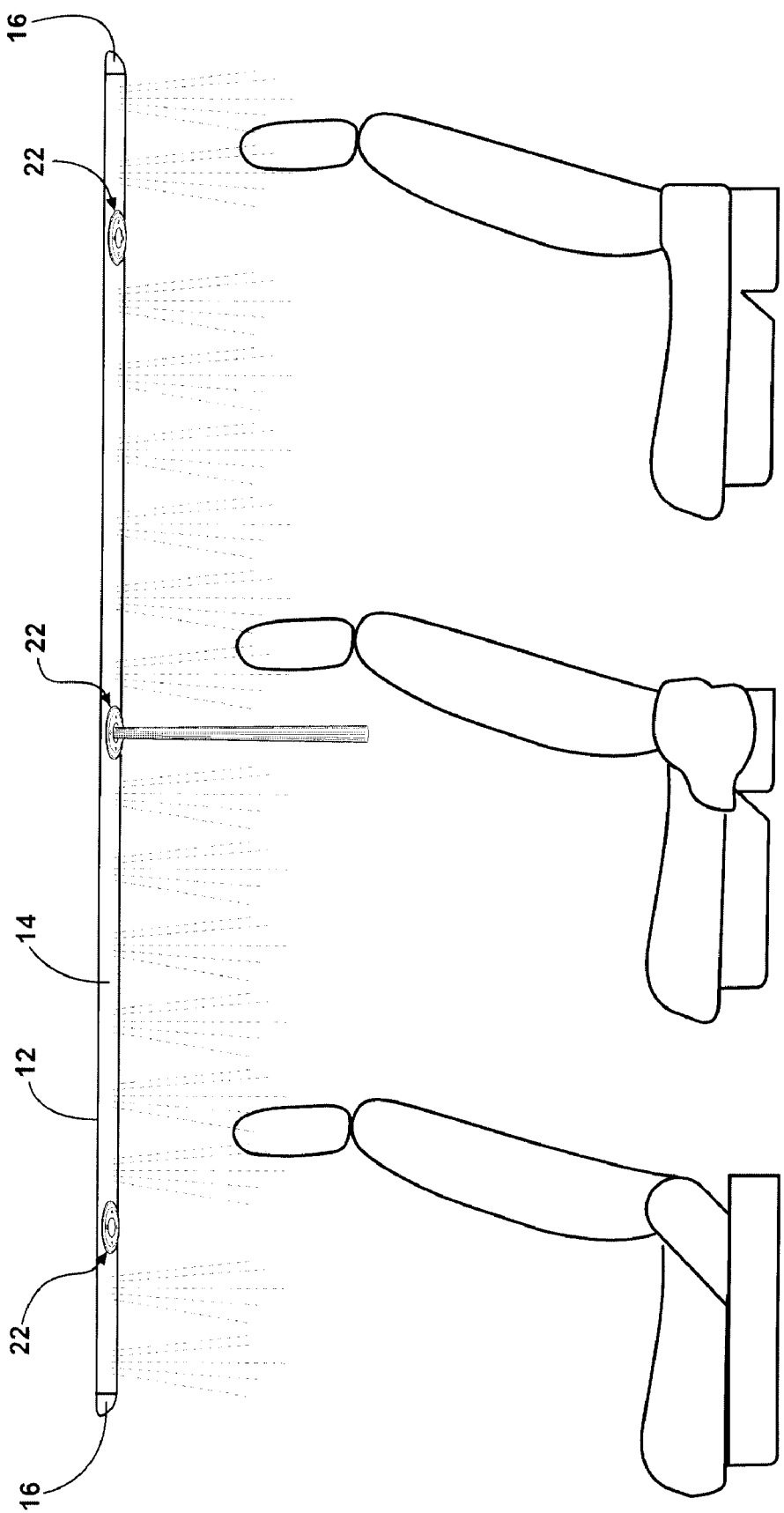
FIG. 8 is a view as in FIG. 7, but depicting the subject lighting assembly in a second intensity level illumination mode together with one of several spot lamps energized to provide high-intensity, targeted spot illumination within the passenger compartment.

Thus a first mode of operation for the subject lighting assembly 10 is depicted in FIGS. 3, 6A and 7, wherein the light sources 18 are energized to maximum, first intensity level creating a high-intensity general illumination within the passenger compartment. The first intensity level of light mode is initiated by a person producing a safety approach signal, which may be either activating the key fob 26, lifting the door handle, or some other predictable action. In the first intensity level condition, all or a substantial majority of the light sources 18 are energized, together with the spot light sub-assembly 22, to create a bright white or otherwise highly revealing light within the passenger compartment. This maximum illumination, first intensity level mode enables an individual approaching the interior passenger compartment to see clearly throughout the entire space. This illumination level is so bright during this first intensity level, that an appreciable portion of the vehicle exterior will also be illuminated by way of light spilling through the windows. By brightly illuminating the interior passenger compartment with this first intensity level of light, the human concern of whether the interior space is safe is solved.

Once the driver has, to their satisfaction, determined that the interior space is safe, the vehicle is presumably occupied. The next sequential concern presented to a person in the interior space is whether that space is comfortable for them. In terms of lighting, comfort is accomplished through proper lighting color, intensity and location. FIG. 6B illustrates a second mode of operation for the subject lighting assembly 10, here described as a lower, second intensity level of interior light illumination that creates a welcoming glow within the passenger compartment. The second intensity level is automatically initiated when the vehicle door 28 is opened. In this condition, Either specific colored (i.e., non-white) light sources 20 can be used during this mode, or else the regular light sources 18 can be used—provided they are fewer in number or else energized at a lower intensity value than in the first intensity level mode. Preferably, although not necessarily, amber colored light baths the vehicle interior adding the sensation of warmth and a calming mood. If the amber color is not convenient to produce for any reason, then the light sources 18 can be energized so as to provide a less intense lighting environment within the interior passenger compartment as compared with the first intensity level. A person perceives the sensation of comfort by having enough ambient light within the passenger compartment to situate themselves and their belonging and/or passengers before putting the vehicle into motion. Thus, during the second intensity level mode, the vehicle shift lever will remain in a Park condition.

Figure 6C:
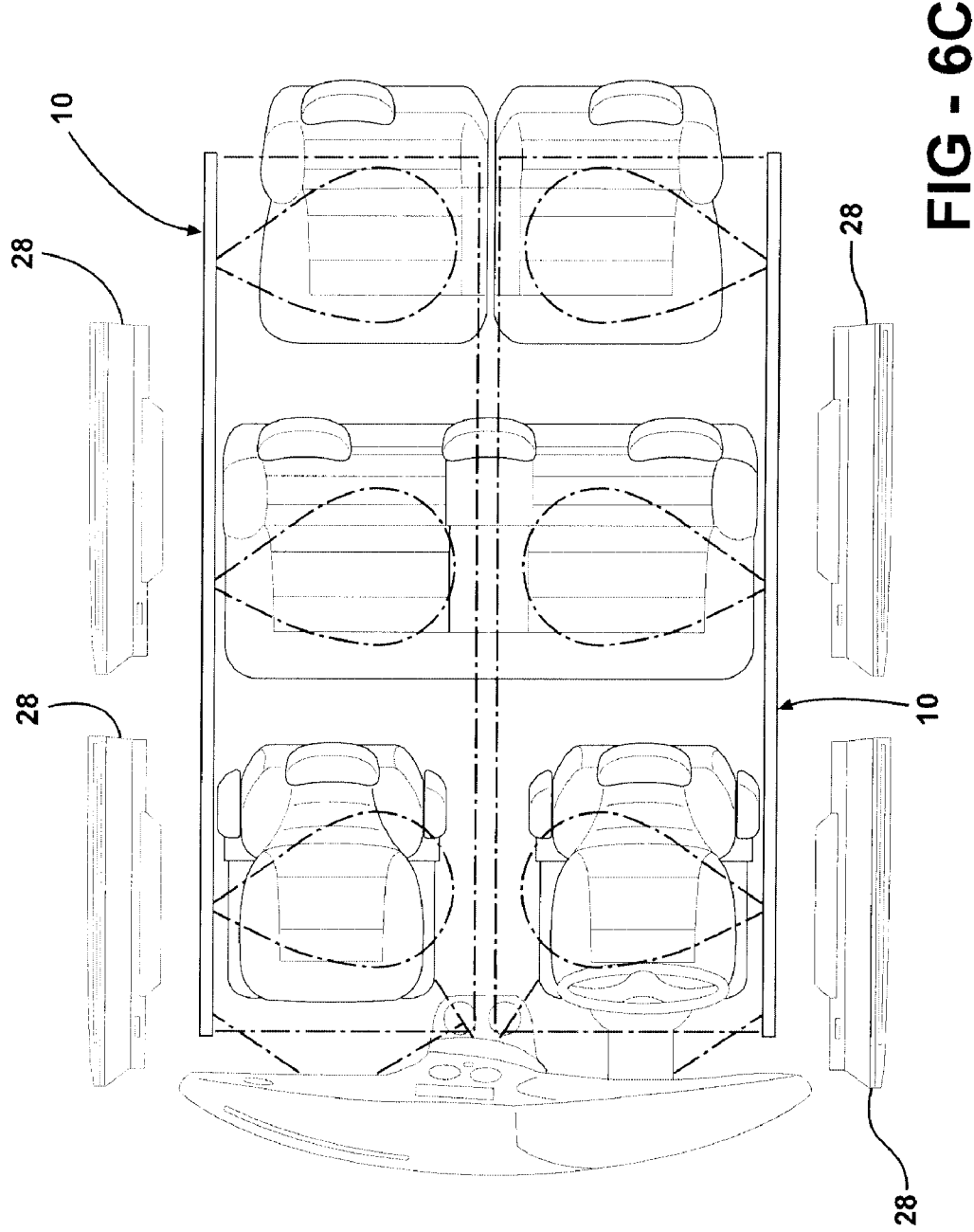
Figure 6C:
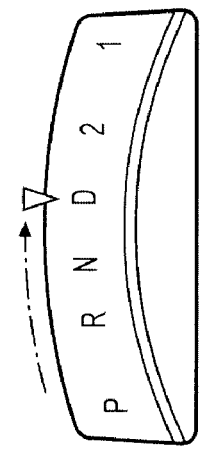
Figure 6D:
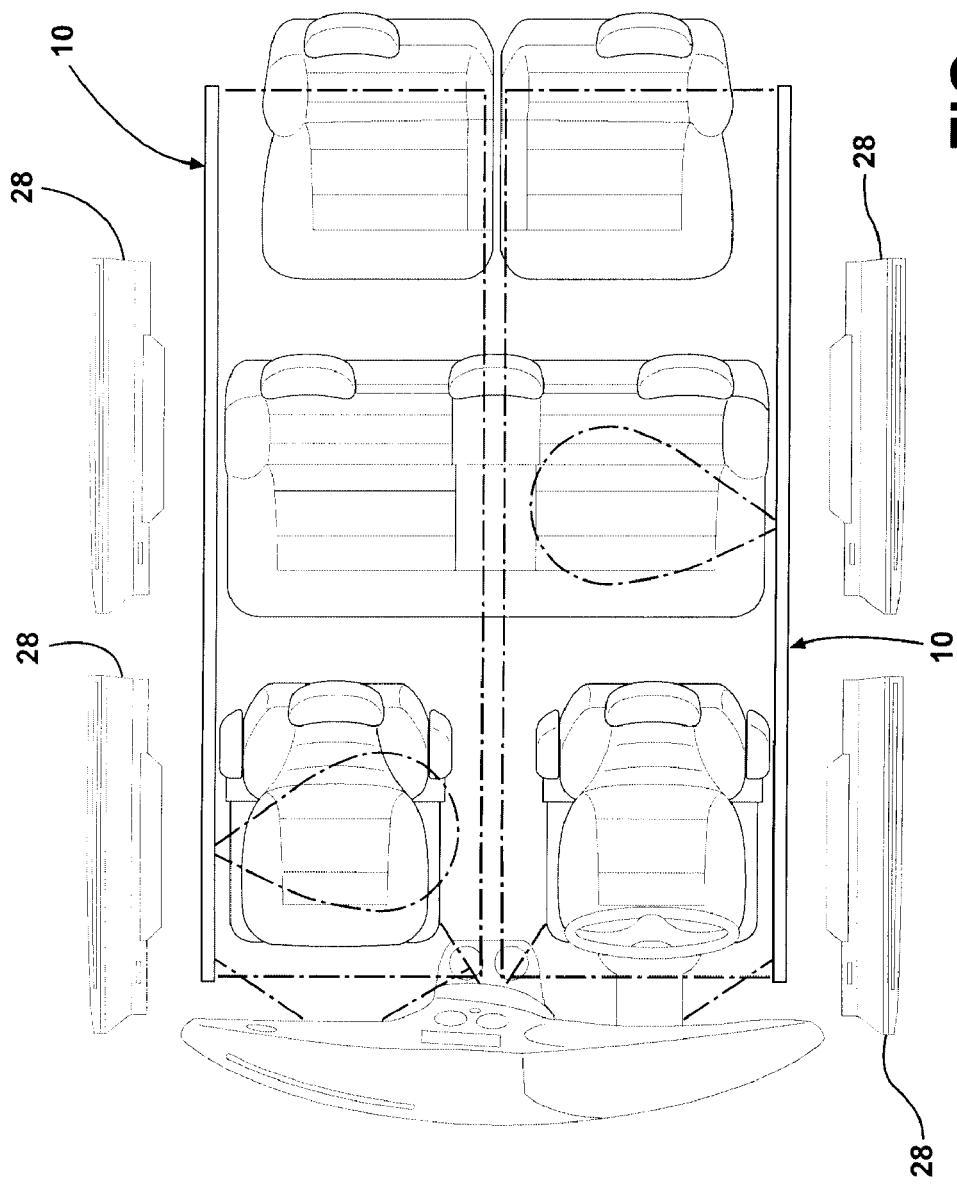
Figure 6D:
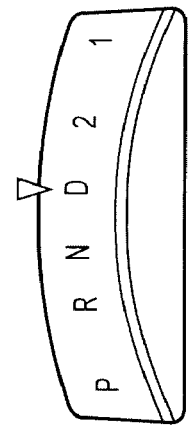

Once comfort has been achieved within the interior space, and the vehicle is ready to be put into motion, the next issue presented to an occupant is whether the space adequately places them in a mood that is conducive to safe, stress-free driving. In terms of lighting, the necessary mood shift is accomplished through proper lighting color, intensity and location. FIGS. 4, and 6C illustrate a third mode of operation for the subject lighting assembly 10, here described as a third intensity level or the mood illumination mode. Automatically upon movement of the vehicle shift lever out of its Park condition, such as into the Drive condition for example, only the colored 20 light sources are energized so as to provide a subdued, comfortable lighting environment within the interior passenger compartment. Preferably, although not of necessity, the color of the light in this third intensity level is altered to achieve a cool blue appearance that gives the sensation of washing away stress and prepares the person for a peaceful drive. If it is not desired to use colored light sources, or to subtly augment the colored light sources 20, the regular light sources 18 can be used—provided they are few in number or else energized at a substantially lower intensity value than in the other, higher intensity modes.

Once the lighting conditions have been optimized to help the driver achieve a stress-free driving mood, and the vehicle has been safely put into motion, the next issue that typically may sporadically arise is whether the interior space adequately accommodates a particular personal need of an occupant. This may include the need to read a map at night, or perhaps find or inspect an object in the vehicle while the vehicle is in motion. This mode is refereed to as a task lighting mode and is carried out on an as-needed basis during the course of the third intensity mode. The Figures in the drawings representative of this task lighting mode of operation include FIGS. 1, 5, 6D and 8 where the spot light sub-assembly 22 is shown energize so as to project a focused beam of light in a desired location. An occupant within the passenger compartment will thus have personal space needs that do not, and should not, involve other occupants during nighttime travel. Thus, during a journey an individual will be able to light specific areas without distracting light reaching others or, more importantly, without reaching the driver.

During the course of vehicle travel at night, the interior illumination intensity will be maintained at the third intensity level. However, upon the occurrence of the transmission shift selector being returned to the Park condition, the subject lighting assembly will automatically adjust back to the second intensity level. In this manner, the lighting conditions are returned to the warm glow of comfort mode as the driver and vehicle occupants prepare themselves and their belongings to disembark.

The subject invention can thus be described as a method for deliberately controlling the intensity of light within an interior passenger compartment in a motor vehicle to create perceived sensations of safety, comfort and personal accommodation in conjunction with specified occurrences. The method comprises the steps of illuminating the interior passenger compartment with a plurality of light sources 18, 20, 22 inside the passenger compartment to achieve a maximum first intensity level of light in response to producing the safety approach signal as a driver (or person) approached a parked motor vehicle. This first intensity level of illumination satisfies the natural human desire to be safe. The act of opening the door 28 directly results in automatically decreasing the interior illumination intensity to a lower second intensity level. This second intensity level of illumination satisfies the natural human desire to be comfortable within a confined space, i.e., the interior passenger compartment. Then later, once the transmission shift selector is moved away from the Park condition, the interior light intensity is automatically decreased to a third intensity level, lower than the second intensity level, to provide the sensation of stress reduction. This third intensity level of illumination satisfies the natural human desire to be at peace. Intermittently during this third intensity level mode, the driver or other occupants may have a task driven desire to illuminate a localized region of the passenger compartment, which is accommodated by the spot light sub-assembly 22 creating a bright white or otherwise highly revealing beam of light within the passenger compartment.

Thus, the subject light assembly 10 provides smooth, transitional lighting for flooding the vehicle interior with light when entering or exiting the vehicle. Colored or other low intensity mood lighting is provided for a subdued level of light, thereby addressing comfort issues. A swiveling, movable spot light sub-assembly 22 is provided for reading or observing an object within the interior space on an as-needed basis.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for deliberately controlling the intensity of light within an interior passenger compartment in a motor vehicle to create perceived sensations of safety, comfort and personal accommodation in conjunction with specified occurrences, said method comprising the steps of:
    approaching a parked motor vehicle of the type having an interior passenger compartment, at least one door for accessing the passenger compartment, and a transmission shift selector disposed within the passenger compartment;
    producing a safety approach signal;
    illuminating the interior passenger compartment with a plurality of light sources inside the passenger compartment to achieve a maximum first intensity level of light in response to said step of producing a safety approach signal;
    opening the door following said step of illuminating the interior passenger compartment;
    automatically decreasing the interior illumination intensity to a lower second intensity level in response to said step of opening the door;
    automatically decreasing the interior light intensity to a third intensity level, lower than the second intensity level, in response to moving the transmission shift selector away from a Park condition;
    said step of producing a safety approach signal including generating a wireless electromagnetic wave;
    said step of illuminating the interior passenger compartment with a plurality of light sources to the first intensity level including energizing at least one spot light sub-assembly;
    said step of illuminating the interior passenger compartment with a plurality of light sources including passing at least a portion of the emitted light through a diffuser lens;
    said step of automatically decreasing the interior light intensity to a third intensity level including projecting a non-white colored light into the passenger compartment;
    selectively energizing and de-energizing the spot light sub-assembly during the third intensity level; and
    automatically returning the interior illumination intensity to the second intensity level in response to moving the transmission shift selector into the Park condition from any other condition.

2. The method of claim 1 wherein said step of generating a wireless electromagnetic wave includes depressing a button on a key fob.

3. The method of claim 1 wherein said step of illuminating the interior passenger compartment with a plurality of light sources includes energizing at least one light emitting diode.

4. The method of claim 1 wherein said step of energizing at least one spot light sub-assembly includes swiveling a beam of light projected by the spot light sub-assembly.

\* \* \* \* \*